US012001234B1

(12) United States Patent
Hashim

(10) Patent No.: US 12,001,234 B1
(45) Date of Patent: Jun. 4, 2024

(54) BANDGAP CIRCUITRY

(71) Applicant: TEXAS INSTRUMENTS INCORPORATED, Dallas, TX (US)

(72) Inventor: Ahmed Essam Hashim, Gilbert, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/150,914

(22) Filed: Jan. 6, 2023

(51) Int. Cl.
*G05F 3/30* (2006.01)
*G05F 3/20* (2006.01)
*G05F 3/22* (2006.01)
*G05F 3/26* (2006.01)

(52) U.S. Cl.
CPC .............. *G05F 3/205* (2013.01); *G05F 3/227* (2013.01); *G05F 3/267* (2013.01); *G05F 3/30* (2013.01)

(58) Field of Classification Search
None
See application file for complete search history.

(56) References Cited

U.S. PATENT DOCUMENTS 4,263,519 A * 4/1981 Schade, Jr. ............... G05F 3/30 330/261
4,317,054 A * 2/1982 Caruso ...................... G05F 3/30 327/437
4,506,208 A * 3/1985 Nagano ..................... G05F 3/22 327/535
4,978,868 A * 12/1990 Giordano .................. G05F 3/30 327/539
5,568,045 A * 10/1996 Koazechi ................ G05F 3/267 323/314
6,005,374 A * 12/1999 Tasdighi .................. G05F 3/30 323/273
6,784,725 B1 * 8/2004 Wadhwa .................. G05F 3/30 327/543
8,680,839 B2 * 3/2014 Venkiteswaran S. ..... G05F 3/30 323/311
11,385,669 B2 * 7/2022 Nome Silva .............. G05F 3/30
11,387,731 B2 * 7/2022 Jing .................... H02M 1/0003
11,784,568 B2 * 10/2023 Priego ................... H02M 3/158 323/259
2008/0136382 A1 * 6/2008 Chellamuthu .......... H02M 1/36 323/234

* cited by examiner

*Primary Examiner* — Jeffrey S Zweizig
(74) *Attorney, Agent, or Firm* — Charles F. Koch; Frank D. Cimino

(57) ABSTRACT

In a described example, a circuit includes a first bipolar junction transistor (BJT) having a first base, a first emitter and a first collector. A second BJT has a second base, a second emitter and a second collector, in which the first collector is coupled to the second collector. A bandgap core circuit has first and second core inputs and a bandgap output. The first core input is coupled to the first emitter, the second core input is coupled to the second emitter, and the first and second bases are coupled to the bandgap output.

18 Claims, 4 Drawing Sheets

BANDGAP CIRCUITRY

TECHNICAL FIELD

This description relates to bandgap circuitry.

BACKGROUND

Bandgap reference circuits are used to provide a reference voltage in a variety of mixed signal integrated circuit (IC) applications, such as power converters, analog to digital converters, digital to analog converters. In these and other applications, it is desirable to provide a precise reference voltage that does not vary with changing temperature or load conditions.

SUMMARY

An example circuit includes a first bipolar junction transistor (BJT) having a first base, a first emitter and a first collector. A second BJT has a second base, a second emitter and a second collector, in which the first collector is coupled to the second collector. A bandgap core circuit has first and second core inputs and a bandgap output. The first core input is coupled to the first emitter, the second core input is coupled to the second emitter, and the first and second bases are coupled to the bandgap output.

Another example circuit includes a first bipolar junction transistor (BJT) having a first base, a first emitter and a first collector. A second BJT having a second base, a second emitter and a second collector, in which the first collector is coupled to the second collector. A first resistor has first and second resistor terminals, in which the first resistor terminal is coupled to the first emitter. A second resistor has third and fourth resistor terminals, in which the third resistor terminal is coupled to the second resistor terminal. A third resistor has a fifth resistor terminal coupled to the second emitter and a sixth resistor terminal coupled the fourth resistor terminal. An error amplifier has first and second amplifier inputs and an amplifier output. The first amplifier input is coupled to the second emitter, the second amplifier input is coupled to the second resistor terminal, and the amplifier output is coupled to the first base.

Another described example provides a circuit that includes a first NPN bipolar junction transistor (BJT) having a first base, a first emitter and a first collector. A second NPN BJT has a second base, a second emitter and a second collector, in which the second collector is coupled to the first collector. A bandgap core circuit has first and second core inputs and a bandgap output. The first core input is coupled to the first emitter, the second core input is coupled to the second emitter, and the first and second bases are coupled to the bandgap output. A voltage supply has a supply output coupled to the first collector.

DETAILED DESCRIPTION

This description relates to bandgap circuitry and to power converter circuits that include the bandgap circuitry.

As an example, the bandgap circuitry includes first and second bipolar junction transistors (BJTs) having respective collectors, which are coupled together and to a voltage supply. Each of the first and second BJTs is configured to supply current to bandgap core circuitry, which includes first and second resistor networks coupled between the first and second BJTs and a ground terminal. An error amplifier has first and second amplifier inputs coupled to the respective first and second resistor networks. The error amplifier is configured to provide a bandgap voltage at an amplifier output responsive to voltages received at the first and second amplifier inputs. The bases of the first and second BJTs are also coupled to the amplifier output. Because the collectors of the first and second BJTs are outside of (e.g., isolated from) the bandgap core circuit, noise and injected current at the collectors do not disturb the bandgap core circuit. As a result, the bandgap voltage provided at the amplifier output likewise is not affected by substrate injection or noise, and thus provides an improved reference independent of noise and current levels.

Figure 1:
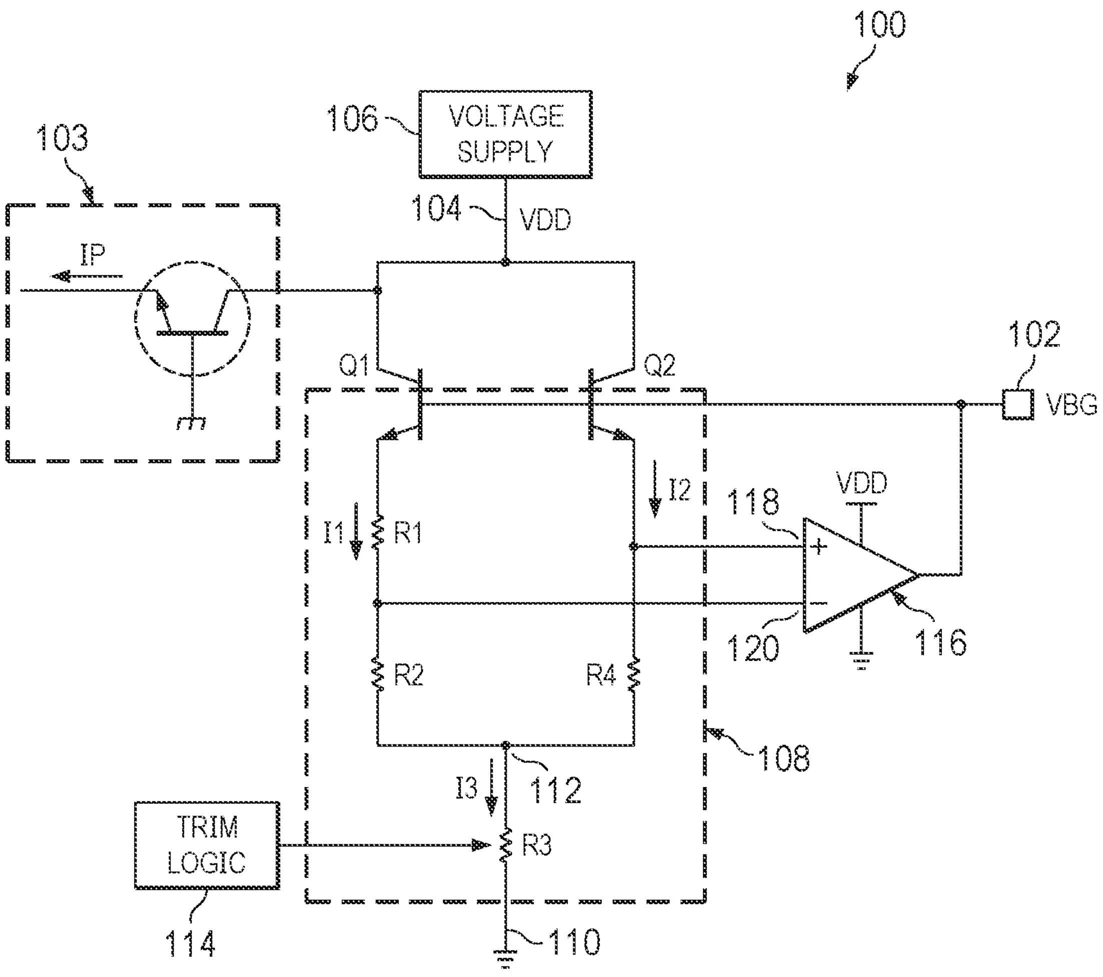
FIG. 1 is a circuit diagram showing an example bandgap circuit.

FIG. 1 shows an example bandgap circuit 100 configured to provide a bandgap voltage VBG at an output 102. The circuit 100 includes a first and second BJTs Q1 and Q2. Q1 and Q2 each have a respective base, emitter and collector, in which both bases are coupled to the output 102 and both collectors are coupled to a voltage input terminal 104. In an example, Q1 is configured to be N times (Nx) bigger than Q2, where N is greater than one. As a result of Q1 being larger than Q2, Q1 will exhibit greater leakage than Q2 at increased temperatures. A voltage supply circuit 106 has an output coupled to the voltage input terminal 104. The voltage supply circuit 106 is configured to supply a power supply voltage VDD at the voltage input terminal 104, such as a positive DC voltage.

The bandgap circuit 100 includes a bandgap core 108 coupled between Q1 and Q2 and a ground terminal 110. In the example of FIG. 1, the bandgap core 108 has a first leg coupled between the emitter of Q1 and the ground terminal 110 and a second leg coupled between the emitter of Q2 and the ground terminal 110. The first leg includes resistors R1, R2 and R3, in which R1 and R2 are coupled in series between the emitter of Q1 and a respective terminal 112 of R3. The second leg includes resistors R4 and R3, in which R4 is coupled between the emitter of Q2 and the terminal 112. In an example, R2=R4 and the first leg of R1, R2 and R3 has a greater impedance than the second leg of R4 and R3. Thus, the first leg may be referred to as a high-impedance leg and the second leg may be referred to as a low-impedance leg.

The resistor R3 can be a trim resistor for the circuit, such as having a variable resistance. For example, trim logic circuitry 114 can have an output coupled to an input of a variable trim resistor R3. The trim logic circuitry 114 is configured to provide a trim value (e.g., a multi-bit digital value) to an arrangement of switches to control a resistance of R3 between the terminals 110 and 112. In an example, the trim value can be set responsive to a user input providing a control signal at an input terminal of an integrated circuit (IC) or a control signal from an on-chip controller.

An amplifier 116 has first and second amplifier inputs 118 and 120 coupled to respective legs of the bandgap core 108. For example, the first amplifier input 118 is coupled to the emitter of Q2, and the second amplifier input 120 is coupled to a terminal at a juncture between R1 and R2. The amplifier 116 also has an amplifier output coupled to bandgap output 102 to which the respective bases of Q1 and Q2 are also coupled. The amplifier 116 is configured to provide the bandgap voltage VBG at the bandgap output 102 responsive to the voltages at 118 and 120.

As an example, the bandgap core 108 is configured to provide currents I1 and I2 in each of the respective legs responsive the bandgap voltage VBG, which results in current I3 through the trim resistor R3 (e.g., I3=I1+I2). During normal operation, in which the resistors R1, R2, R3 and R4 configured appropriately, the bandgap core 108 is configured to provide the currents I1 and I2 to be equal (e.g., I1=I2).

In the example of FIGS. 1, Q1 and Q2 are implemented as NPN transistors, which are often used in bandgap circuits because of their enhanced hFE (beta) and better linearity. However, NPN transistors typically have a parasitic diode, which can be coupled to the substrate through an N-type buried layer (NBL). In applications where an N-type buried layer (NBL) can go negative with respect to the substrate (e.g., switching power converters), minority carriers are injected into the substrate and can be collected by the collectors of the reference NPNs. These carriers can adversely affect operation of the bandgap core and disturb the reference. A parasitic NPN for Q1, shown at 103, thus is configured to sink current IP from the collector of Q1 due to the carrier injection.

The bandgap circuit 100 described herein can reduce or eliminate the effect of the carrier injection and other noise on the bandgap core 108. As a result, the bandgap reference voltage VBG is resistant or immune to such noise. In the example of FIG. 1, the collectors of the Q1 and Q2 are coupled to the voltage input terminal 104 and not part of the loop of the bandgap core 108. Consequently, any collected carriers flow into the voltage input terminal 104 (e.g., the voltage supply 106 is configured to provide current), and such carriers do not disturb the bandgap core. The voltage supply 106 also is configured to supply current, including current IP due to injecting carriers, to the collectors of Q1 and Q2 to reduce or eliminate other substrate noise and/or leakage (e.g., due to Q1 being Nx larger than Q2) that might otherwise affect the bandgap reference VBG.

In the example of FIG. 1, the transistors Q1 and Q2 are implemented as NPN BJTs. In other examples, different types of transistors can be used to implement the transistors Q1 and Q2, such as PNP BJTs.

Figure 2:
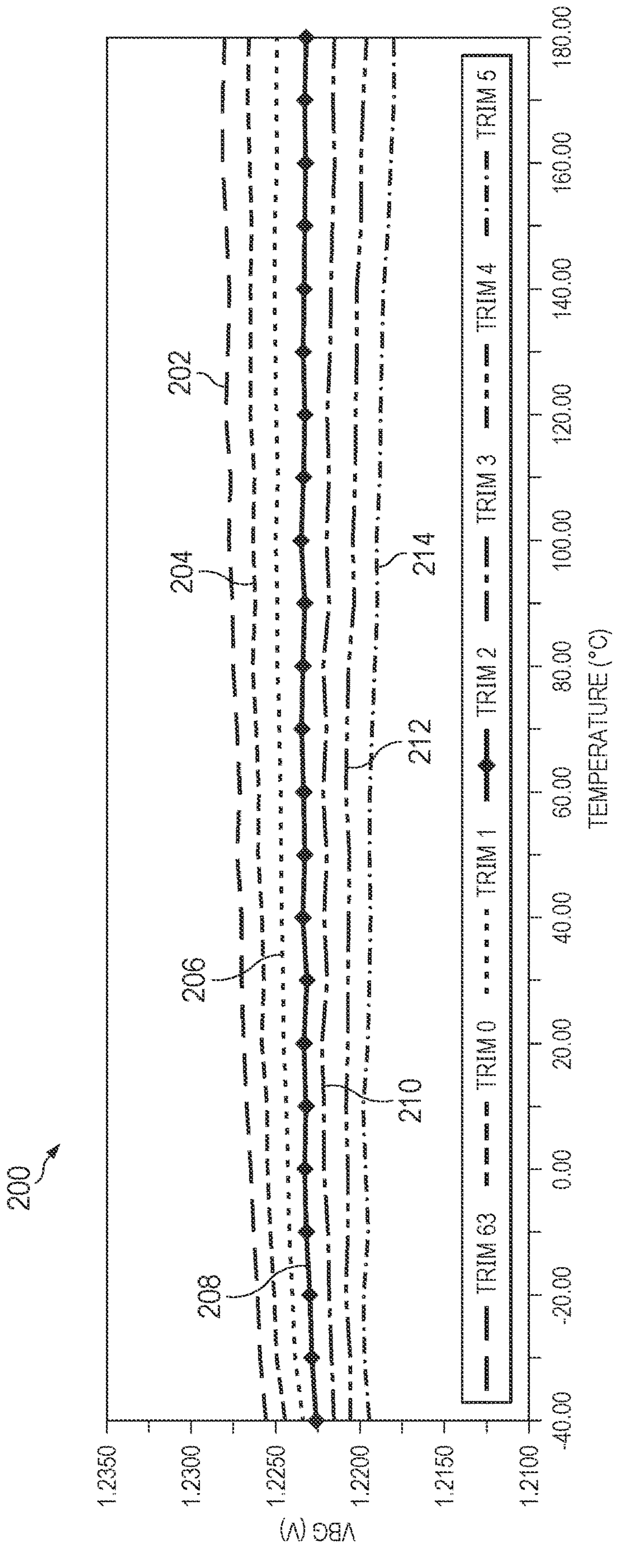
FIG. 2 is a signal diagram showing examples of bandgap voltages for different circuits.

FIG. 2 is a signal diagram 200 showing examples of plots bandgap voltages VBG over temperature, shown ranging from −40° C. to 180° C. for the example circuit 100 of FIG. 1 with a DC supply voltage coupled to the collectors of Q1 and Q2. In particular, the diagram 200 includes plots 202, 204, 206, 208, 210, 212 and 214 for the circuit 100 having different trim configurations. As shown, the trim configuration providing the bandgap voltage of plot 208 exhibits substantially constant bandgap voltage over temperature, and thus provides a useful trim value for the circuit 100.

Figure 3:
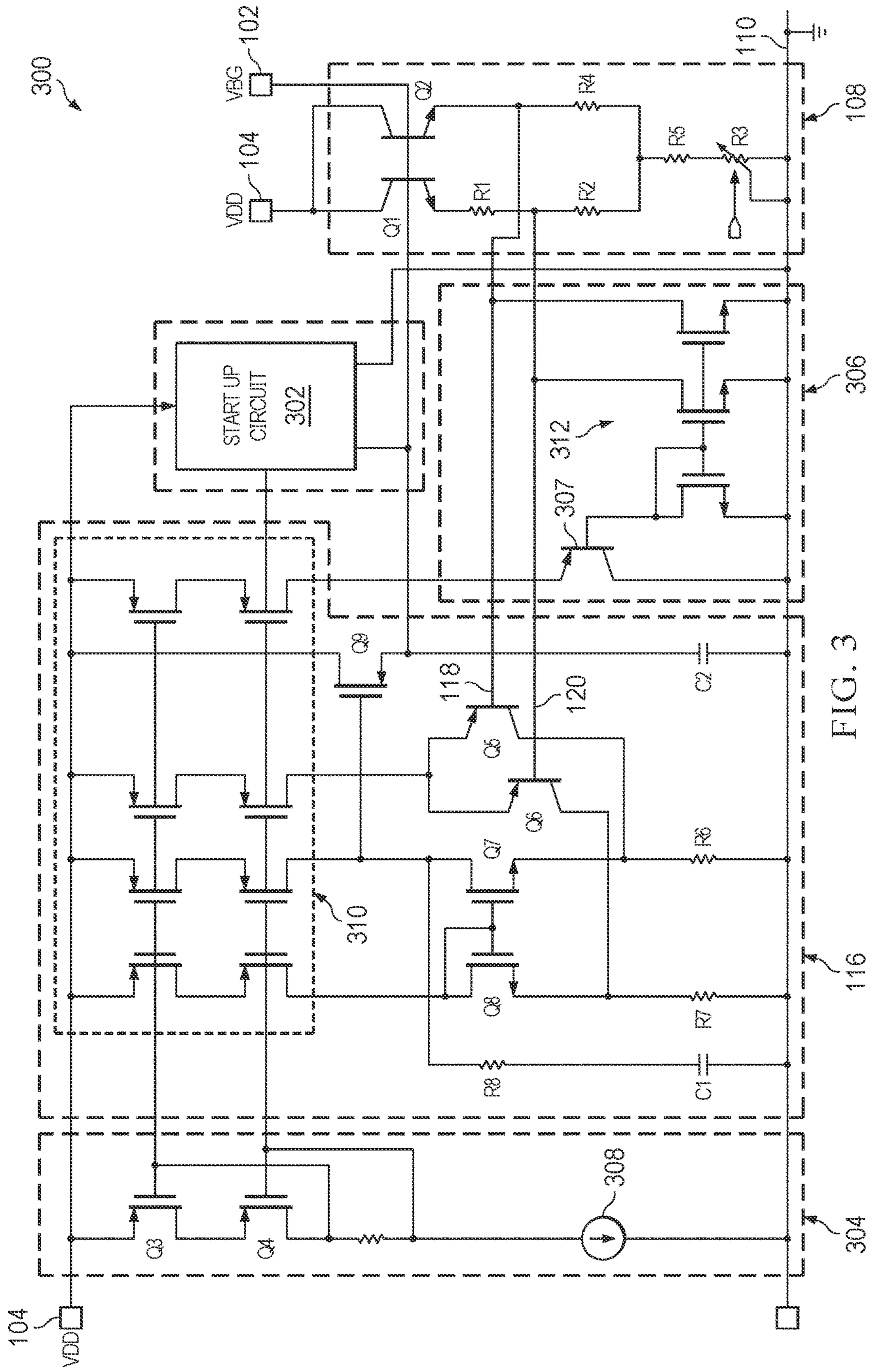
FIG. 3 is circuit diagram showing another example bandgap circuit.

FIG. 3 is circuit diagram showing another example bandgap circuit 300. The circuit 300 is a useful example of the circuit 100. Accordingly, the description of FIG. 3 also refers to the circuit 100 of FIG. 1. The circuit 300 includes NPN BJTs Q1 and Q2, in which both bases are coupled to the output 102 and both collectors are coupled to the voltage input terminal 104, such as a positive DC voltage. Advantageously, in the example of FIG. 3, the collectors of Q1 and Q2 are outside of (e.g., isolated from) the bandgap core 108. The emitters of Q1 and Q2 are coupled to the bandgap core 108, which is coupled between Q1 and Q2 and the ground terminal 110. As in the example of FIG. 1, the bandgap core 108 includes resistors R1, R2, R5 and R3 coupled between the emitter of Q1 and the ground terminal 110 (e.g., R3 is a trim resistor). The bandgap core 108 also includes resistors R4, R5 and R3 coupled between the emitter of Q2 and the ground terminal 110. For example, R2=R4. Each of the resistors R1, R2, R3, R4 and R5 can be configured to have respective values to provide the bandgap voltage VBG at 102.

The circuit 300 also includes a start-up circuit 302 having an input coupled to the voltage input terminal 104. The start-up circuit 302 also has an output coupled to the output 102, which is coupled to the bases of Q1 and Q2. The start-up circuit 302 also has an output coupled to the amplifier 116. The start-up circuit 302 is configured to provide a start-up voltage to activate the bandgap circuit 300, such as responsive to providing the input supply voltage VDD at 104. For example, the bandgap circuit 300 includes a current source circuit 304 and a current compensation circuit 306. The current source circuit 304 includes FETs Q3 and Q4 coupled in series with a constant current source 308 between the terminals 104 and 110. The current source circuit 304 is also coupled to a current mirror network 310, which includes an arrangement of FETs. The current mirror network 310 is configured to mirror current from the current source circuit 304 to the amplifier 116 and to the compensation circuit 306.

The amplifier 116 is a differential amplifier having inputs 118 and 120 coupled to respective legs of the bandgap core 108. In the example of FIG. 3, the amplifier 116 includes transistors Q5 and Q6 coupled between the current mirror network 310 and the ground terminal 110. For example, Q5 and Q6 are PNP BJTs, in which the input 118 is coupled to the base of Q5 and the input 120 is coupled to the base of Q6. The emitter of Q5 is coupled to the emitter of Q6, which are also coupled to a leg of the current mirror network 310. A resistor R6 is coupled between the collector of Q5 and the ground terminal 110, and another resistor R7 is coupled between the collector of Q6 and the ground terminal. A FET Q7 has a source coupled to the collector of Q5 and a drain coupled to a leg of the current mirror network 310. Another FET Q8 has a source coupled to the collector of Q6 and a drain coupled to the base of Q7, the base of Q8 and another leg of the current mirror network 310. A compensation network, which includes a resistor R8 coupled in series with a capacitor C1, is coupled between the drain of Q7 and the ground terminal 110. A capacitor C2 can be coupled between the bandgap output 102 and the ground terminal 110. In the example of FIGS. 3, Q5 and Q6 are biased to conduct current responsive to the voltages at the inputs 118 and 120, which depend on the current through the respective high and low impedance legs. Voltages are provided across resistors R6 and R7 responsive to the current through Q5 and Q6. The amplifier 116 is configured to regulate inputs 118 and 120 to the same level. In doing so, the currents I1 and I2 through resistors R2 and R4 are likewise regulated to be equal. The circuit 100 is configured to provide the bandage voltage VBG responsive to the currents through both Q1 and Q2 being equal, which is a result of the amplifier 116 driving the bandgap output 102 to the proper level (e.g., when voltages at inputs 118 and 120 are equal and I1=I2). In the example of FIG. 1, the bandgap voltage VBG can be expressed as follows:

$$VBG = Vt\ln(N)\frac{2R3 + R4}{R1} + VBE2$$

where: $Vt\ln(N) = VBE2 - VBE1 = IR1,$

-continued $$I = I1 = I2 = Vt\ln(N)/R1,$$

$VBE2$ is the base-emitter voltage of $Q2$, and $VBE1$ is the base-emitter voltage of $Q1$.

The compensation circuit 306 includes an arrangement of transistors configured to compensate for base currents of Q5 and Q6 of the amplifier 116. As an example, the compensation circuit 306 is configured to provide emitter current through a PNP transistor Q9, which is equal to the current in Q5 and Q6. The base current from the PNP Q9 is also similar to the base current coming of Q5 or Q6. The compensation circuit 306 includes an NMOS current mirror 312 configured to mirror the base current of Q9 and to pull down on the bases of Q5 and Q6, which results in the current going into and out of the bandgap core 108 due to the amplifier 116 equal to zero. In an example where Q5 and Q6 are implemented as FETs (instead of BJTs, as shown), the compensation circuit 306 can be omitted.

Figure 4:
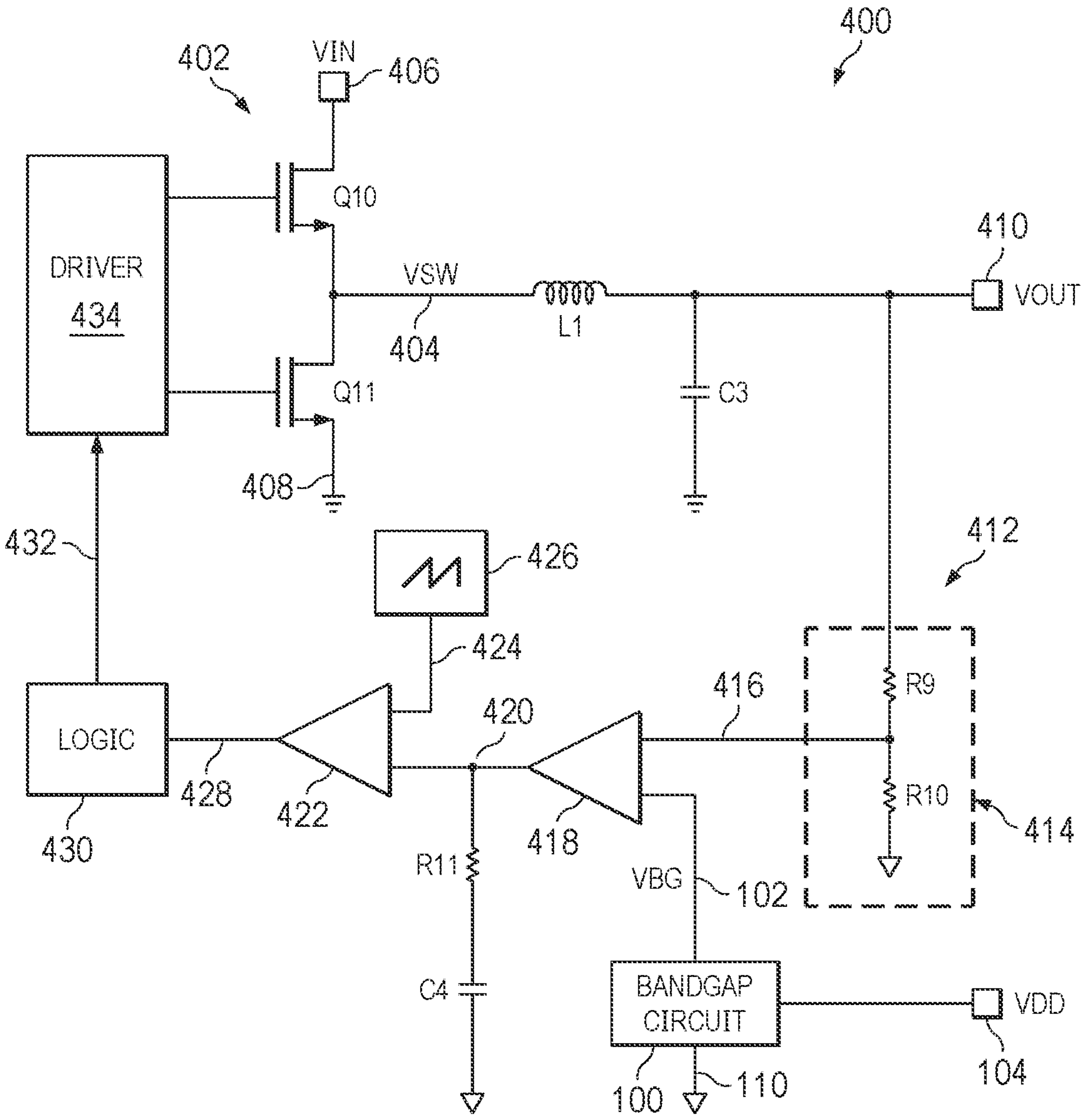
FIG. 4 is a schematic block diagram showing an example power converter circuit.

FIG. 4 is a schematic block diagram showing an example power converter circuit 400. The circuit 400 includes an output stage 402 having an output 404. In the example of FIG. 4, the output stage 402 is a half-bridge circuit that includes transistors Q10 and Q11 coupled between respective voltage terminals 406 and 408, shown as input voltage (VIN) and ground terminals. For example, Q10 and Q11 are FETs, and the source of Q10 and the drain of Q11 are coupled the output 404. Q10 and Q11 are configured to providing a switching voltage signal VSW at the output 404 responsive to gate drive signals received at the respective gates of Q10 and Q11. The drain of Q10 is coupled to the terminal 406, and the source of Q11 is coupled to the ground terminal 408. An inductor L1 and a capacitor C3 can be coupled between the output 404 and a load output terminal 410, in which the capacitor C3 is coupled between terminal 410 and ground. The power converter circuit 400 is thus configured to provide an output voltage VOUT across the inductor L1 and capacitor C3 responsive to the switching voltage VSW. For example, the power converter circuit 400 is a DC-DC switching converter, such as a buck, boost, buck-boost or other type of power converter.

As a further example, the circuit 400 includes a control loop circuit 412. The control loop circuit includes a voltage sensor circuit 414. The voltage sensor circuit 414 has a sense input and a sense output 416, in which the sense input is coupled to the terminal 410. In the example of FIG. 4, the voltage sensor circuit 414 is a divider circuit that includes resistors R9 and R10 coupled between the terminal 410 and a ground terminal. The voltage sensor circuit 414 is configured to provide an output voltage representative of (e.g., proportional to) the output voltage VOUT at 410.

The circuit 400 also includes a bandgap circuit 100. The bandgap circuit 100 can be implemented as one of the example circuits described herein with respect to FIGS. 1-3. Accordingly, the description of the bandgap circuit also refers to FIGS. 1 and 3. Thus, the bandgap circuit 100 is coupled between an input supply terminal 104 and the ground terminal 110. The bandgap circuit 100 is configured to provide a bandgap reference voltage VBG at an output 102, such as described herein.

The loop circuit 412 also includes an error amplifier (e.g., an error amplifier) 418 having first and second inputs and an output 420. The first input is coupled to the sense output 416 and the second input is coupled to the output 102 of the bandgap circuit 100. The error amplifier 418 is configured to provide an error signal at 420 responsive to the sensor signal at 416 and the bandgap reference voltage VBG at 102. In some examples, a filter, including a resistor R11 and a capacitor C4, is coupled between the output 420 and ground. The filter can provide a filtered version of the error signal at 420.

A comparator 422 has one input coupled to the output 420 and another input coupled to an output 424 of a sawtooth generator 426. In an example, the sawtooth generator 426 is configured to provide a sawtooth signal (or another oscillating signal waveform, such as a triangle or sinusoidal waveform) responsive to the switching signal VSW at the output 404. The comparator 422 is configured to provide a comparator output signal at an output 428 responsive to the sawtooth signal at 424 and the error signal at 420. For example, the comparator output signal at 428 includes a series of pulses.

A logic circuit 430 has an input coupled to the comparator output 428 and a logic output 432 coupled to an input of a driver circuit (e.g., a gate driver circuit) 434. The logic circuit 430 is configured to provide a logic control signal responsive to the comparator output signal at 428. For example, the logic circuit is a digital circuit configured to provide the logic control signal as a series of pulses (e.g., logic 0 or 1) having a variable pulse width, such as a pulse-width modulated (PWM) logic signal. The driver circuit 434 is configured to amplify the logic control signal at 428 to respective drive signals sufficient to drive Q10 and Q11. For example, the gate drive signals are inverted versions of each other to turn on and off Q10 and Q11 in a mutually exclusive manner.

As described herein, the bandgap circuit 100 is configured to provide the bandgap reference voltage VBG at 102 in a way that compensates for substrate injection and other sources of error, such as current leakage and switching noise. As a result of a more stable reference voltage, operating characteristics of the power converter circuit 400 are likewise improved over temperature as well as at heavy load conditions and/or in noisy environments.

In this description, numerical designations "first", "second", etc. are not necessarily consistent with same designations in the claims herein. Additionally, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. A circuit comprising:

a first bipolar junction transistor (BJT) having a first base, a first emitter and a first collector;

a second BJT having a second base, a second emitter and a second collector, in which the first collector is coupled to the second collector; and a bandgap core circuit having first and second core inputs and a bandgap output, in which the first core input is coupled to the first emitter, the second core input is coupled to the second emitter, and the first and second bases are coupled to the bandgap output;

wherein the bandgap core circuit includes:

a first resistor having first and second resistor terminals, in which the first resistor terminal is coupled to the first emitter;

a second resistor having third and fourth resistor terminals, in which the third resistor terminal is coupled to the second resistor terminal;

a third resistor having fifth and sixth resistor terminals, in which the fifth resistor terminal is coupled to the second emitter, and the sixth resistor terminal is coupled the fourth resistor terminal;

an amplifier having first and second amplifier inputs and an amplifier output, in which the first amplifier input is coupled to the second emitter, the second amplifier input is coupled to the second resistor terminal, and the amplifier output is coupled to the second base; and a trim resistor coupled between the fourth resistor terminal and a ground terminal, and the trim resistor has a variable resistance.

2. The circuit of claim 1, wherein the first and second collectors are coupled to a voltage supply terminal.

3. The circuit of claim 2, further comprising a voltage supply circuit having an output coupled to the voltage supply terminal.

4. The circuit of claim 3, wherein the voltage supply circuit is configured to supply voltage and current to the first and second collectors, in which the current includes current drawn by the bandgap core circuit and error current.

5. The circuit of claim 1, wherein the bandgap core circuit is configured to provide a bandgap voltage at the bandgap output.

6. The circuit of claim 1, wherein each of the first BJT and the second BJT is a respective NPN BJT.

7. The circuit of claim 1, wherein the amplifier is configured to provide an amplifier output signal at the second base responsive to respective voltages at the second emitter and the second resistor terminal, and the amplifier output signal is a bandgap voltage.

8. The circuit of claim 1 implemented in an integrated circuit.

9. The circuit of claim 1, further comprising:

a power converter having an output terminal, the power converter including:

an error amplifier having first and second error inputs and an error amplifier output, in which the first error input is coupled to the bandgap output, the second error input is coupled to the output terminal, and the power converter is configured to provide an output voltage at the output terminal responsive to an error signal at the error amplifier output.

10. A circuit comprising:

a first bipolar junction transistor (BJT) having a first base, a first emitter and a first collector;

a second BJT having a second base, a second emitter and a second collector, in which the first collector is coupled to the second collector;

a first resistor having first and second resistor terminals, in which the first resistor terminal is coupled to the first emitter;

a second resistor having third and fourth resistor terminals, in which the third resistor terminal is coupled to the second resistor terminal;

a third resistor having a fifth resistor terminal coupled to the second emitter and a sixth resistor terminal coupled the fourth resistor terminal;

an error amplifier having first and second amplifier inputs and an amplifier output, in which the first amplifier input is coupled to the second emitter, the second amplifier input is coupled to the second resistor terminal, and the amplifier output is coupled to the first base; and a trim resistor coupled between the fourth resistor terminal and a ground terminal, and the trim resistor has a variable resistance.

11. The circuit of claim 10, wherein the error amplifier is configured to provide an amplifier output signal at the second base responsive to respective voltages at the second emitter and the second resistor terminal, in which the amplifier output signal is a bandgap voltage.

12. The circuit of claim 11, wherein the error amplifier is a first error amplifier, the amplifier output is a first amplifier output, and the circuit further comprises:

a power converter having an output terminal, the power converter including:

a second error amplifier having third and fourth amplifier inputs and a second amplifier output, in which the third amplifier input is coupled to the second base, the fourth amplifier input is coupled to the output terminal, and the power converter is configured to provide an output voltage at the output terminal responsive to an error signal at the second amplifier output.

13. The circuit of claim 10, wherein the first and second collectors are coupled to a voltage supply terminal.

14. The circuit of claim 13, further comprising a voltage supply circuit having an output coupled to the voltage supply terminal, in which the voltage supply circuit is configured to supply voltage and current to the first and second collectors.

15. The circuit of claim 10 implemented as an integrated circuit.

16. A circuit comprising:

a first NPN bipolar junction transistor (BJT) having a first base, a first emitter and a first collector;

a second NPN BJT having a second base, a second emitter and a second collector, in which the second collector is coupled to the first collector;

a bandgap core circuit having first and second core inputs and a bandgap output, in which the first core input is coupled to the first emitter, the second core input is coupled to the second emitter, and the first and second bases are coupled to the bandgap output; and a voltage supply having a supply output coupled to the first collector;

wherein the bandgap core circuit includes:

a first resistor having first and second resistor terminals, in which the first resistor terminal is coupled to the first emitter;

a second resistor having third and fourth resistor terminals, in which the third resistor terminal is coupled to the second resistor terminal;

a third resistor having fifth and sixth resistor terminals, in which the fifth resistor terminal is coupled to the second emitter, and the sixth resistor terminal is coupled the fourth resistor terminal; and a trim resistor coupled between the fourth resistor terminal and a ground terminal, and the trim resistor has a variable resistance.

17. The circuit of claim 16, wherein the bandgap core circuit includes:

an amplifier having first and second amplifier inputs and an amplifier output, in which the first amplifier input is coupled to the second emitter, the second amplifier input is coupled to the second resistor terminal, and the amplifier output is coupled to the second base.

18. The circuit of claim 17, wherein the amplifier is configured to provide an amplifier output signal at the second base responsive to respective voltages at the second emitter and the second resistor terminal, in which the amplifier output signal is a bandgap voltage.

* * * * *